United States Patent [19]
Harnisch et al.

[11] Patent Number: 6,022,043
[45] Date of Patent: Feb. 8, 2000

[54] INTEGRAL AIRBAG DEVICE

[76] Inventors: Hartmut Harnisch, Finkenstrasse 2, D-47929 Grefrath; Martin Specht, Im Harl 4, D-82340 Feldafing, both of Germany

[21] Appl. No.: 09/019,515

[22] Filed: Feb. 5, 1998

[30] Foreign Application Priority Data

Feb. 7, 1997 [DE] Germany .................. 197 04 684

[51] Int. Cl.⁷ .................................................. B60R 21/16
[52] U.S. Cl. .................................. 280/728.2; 280/732
[58] Field of Search ...................... 280/732, 728.2, 280/743.1

[56] References Cited

U.S. PATENT DOCUMENTS

| | | |
|---|---|---|
| 3,197,234 | 7/1965 | Bertrand .................... 280/150 |
| 3,473,824 | 10/1969 | Carey et al. . |
| 3,618,977 | 11/1971 | Klove et al. .............. 280/150 |
| 3,625,543 | 12/1971 | Wolff . |
| 3,756,621 | 9/1973 | Lewis et al. .............. 280/150 |
| 3,799,573 | 3/1974 | McDonald . |
| 3,810,653 | 5/1974 | Schiesterl et al. . |
| 3,856,180 | 12/1974 | Merrell ........................ 222/5 |
| 3,897,961 | 8/1975 | Leising et al. . |
| 3,917,023 | 11/1975 | De Rosa . |
| 3,937,258 | 2/1976 | Loomba ..................... 141/67 |
| 3,961,806 | 6/1976 | Katter ........................ 280/732 |
| 5,295,708 | 3/1994 | Siga et al. . |
| 5,322,322 | 6/1994 | Bark et al. . |
| 5,409,256 | 4/1995 | Gordon et al. . |
| 5,462,308 | 10/1995 | Seki et al. . |
| 5,464,246 | 11/1995 | Castro et al. . |
| 5,480,181 | 1/1996 | Bark et al. . |
| 5,482,313 | 1/1996 | Ikeya et al. .............. 280/728.2 |
| 5,490,691 | 2/1996 | Sinnhuber et al. . |
| 5,540,459 | 7/1996 | Daniel . |
| 5,542,691 | 8/1996 | Marjanski et al. . |
| 5,568,936 | 10/1996 | Spilker et al. . |
| 5,580,081 | 12/1996 | Berg et al. . |
| 5,752,712 | 5/1998 | Acker ........................ 280/728.2 |
| 5,755,457 | 5/1998 | Specht . |

FOREIGN PATENT DOCUMENTS

| | | |
|---|---|---|
| 0 585 612 A3 | 7/1993 | European Pat. Off. . |
| 0 688 700 A1 | 5/1995 | European Pat. Off. . |
| 2 238 343 | 8/1973 | France . |
| 2 696 392 | 4/1994 | France . |
| 2 043 255 | 3/1971 | Germany . |
| 34 22 263 A1 | 6/1984 | Germany . |
| 39 37 377 A1 | 5/1990 | Germany . |
| 42 20 704 A1 | 1/1993 | Germany . |
| 43 20 147 A1 | 6/1993 | Germany . |
| 195 12 332 A1 | 10/1995 | Germany . |
| 195 05 216 A1 | 2/1996 | Germany . |
| 44 26 848 A1 | 2/1996 | Germany . |
| 3-276844 | 12/1991 | Japan . |
| 6 227 340 | 8/1994 | Japan . |
| 7-117 605 | 5/1995 | Japan . |
| 8-026 063 | 1/1996 | Japan . |
| 2 191 450 | 6/1986 | United Kingdom . |
| 2 227 212 | 7/1990 | United Kingdom . |
| WO 94/19215 | 9/1994 | WIPO . |

*Primary Examiner*—Lanna Mai
*Assistant Examiner*—Jeff Restifo
*Attorney, Agent, or Firm*—Harness, Dickey & Pierce, P.L.C.

[57] ABSTRACT

An airbag device for the passenger side of a motor vehicle includes a gas cushion that, in the folded state, is integrated in a unit comprising a reinforcing semi-shell and the instrument panel, and a gas generator that is supported separately on a component which is fixedly connected to the vehicle body. The gas generator communicates with the gas inlet opening of the gas cushion by means of a gas conduit that is preferably of flexible design.

24 Claims, 4 Drawing Sheets

INTEGRAL AIRBAG DEVICE

BACKGROUND OF THE INVENTION

The invention relates to an airbag device which is installed in an instrument panel below a flap on the passenger side of a motor vehicle.

Airbag devices, which are installed in an instrument panel below a flap or a cover on the passenger side of a motor vehicle, have a gas source for a filling gas and a gas cushion which, when filled with the filling gas, unfolds into the vehicle interior. The gas and the gas cushion are arranged near together, if appropriate inside a module. When the gas cushion unfolds, it is pressed through an opening in the instrument panel which, in the state of rest, is covered by the flap. The constructional unit, which comprises the gas source and the gas cushion and is arranged behind the instrument panel generally above the glove compartment, requires a relatively large amount of space, as a result of which the space available for the glove compartment is considerably reduced. Moreover, it is difficult to absorb compressive and/or tensile forces, which occur during the unfolding process and are caused by the unfolding gas cushion, reliably in the area of the instrument panel.

The object of the invention is to provide an airbag device of the type mentioned at the beginning, in which the space available behind the instrument panel in the motor vehicle is utilized for the accommodation of the gas source, in particular the gas generator, with the least possible impairment of the space for the glove compartment.

SUMMARY OF THE INVENTION

According to one embodiment of the invention, this object is achieved by an airbag device installed in an instrument panel below a flap on the passenger side of a motor vehicle, the airbag device having a gas source for a filling gas, a gas conduit and a gas cushion which, when filled with the filling gas, unfolds into the vehicle interior on the passenger side through an opening in the instrument panel which, in the state of rest, is covered by the flap or lid, wherein the gas cushion and gas generator of the device are attached and/or anchored to the vehicle at separate places and are connected to one another by means of a gas conduit for the filling gas. The gas conduit can be designed as a flexible connection, which bridges tolerances, between the gas generator and the gas cushion. However, it is also possible to design the gas conduit to be partially or completely rigid and to provide means which bridge tolerances between the gas generator and gas conduit and/or the attachment of the gas cushion and the gas conduit.

Furthermore, as an independent invention, the gas generator can be attached to the cross-strut (cross-strut AA) which extends between the two A-pillars of the vehicle or a different component which is supported on or attached to the vehicle body, e.g. the splash wall. For this purpose, the cross-strut may be designed in terms of its profile in such a way that a positive-locking connection is produced between the gas generator or an attachment of the gas generator and the cross-strut. The connection between the cross-strut and the gas generator may be effected by means of a holder, fixedly connected to the cross-strut, for the gas generator, by means of a screw connection, or by other suitable means. The gas generator is preferably located on the top side of the cross-strut, so that the space located below it for the glove compartment is not restricted.

The connection, formed by the gas conduit, between the gas cushion and the gas generator may be detachable. In this way, exchange of the gas generator is simplified, since, when the gas conduit has been detached, the attachment location of the gas generator is more easily accessible for exchange in a specific servicing cycle. In this arrangement, it is sufficient to exchange only the gas generator and not, as was previously the case, the entire module with the gas cushion.

In the folded state, the gas cushion is located directly below the flap which closes the opening in the instrument panel through which the gas cushion emerges during the unfolding process when the flap has been opened. The gas cushion, which is preferably arranged in a folded-flat state (double zigzag shape), is located in a holding compartment which is situated directly below the flap and is preferably formed by a reinforcing semi-shell (for example, as described in patent documents DE 44 21 820 and EP 06 88 700) arranged below the instrument panel. Supported in the holding compartment, preferably in a positive-locking manner, is a reinforcing trough which surrounds the folded gas cushion at least partially at the sides and at the bottom. The reinforcing trough is supported in the holding compartment in such a way that compressive forces and tensile forces, occurring during the unfolding of the gas cushion, are absorbed and introduced into the vehicle body, preferably at the cross-strut AA, from the reinforcing trough, preferably via the reinforcing semi-shell and the gas conduit. The gas cushion is preferably connected to the reinforcing trough in a gas-tight manner.

Furthermore, the gas conduit is connected to the reinforcing trough in a gas-tight manner. However, it is also possible for the gas conduit to be connected to the gas cushion in a gas-tight manner. The gas-tight connection of the gas conduit to the reinforcing trough or to the gas cushion is preferably located within the connection, advantageously of annular design, between the gas cushion and the reinforcing trough.

For supporting the reinforcing trough, a support for the reinforcing trough may be provided on the open underside of the holding compartment. In addition, the reinforcing trough may also be supported on the top side of the holding compartment designed as a reinforcing semi-shell. As a result, compressive forces primarily occurring during the unfolding operation are absorbed and transmitted to the vehicle body via the reinforcing semi-shell. By means of the invention, space-saving positioning and mounting of the gas generator in conjunction with a gas cushion, which is integrated as a unit in a holding compartment formed from the instrument panel and the reinforcing semi-shell, are achieved in different vehicle types. In the folded state, the gas cushion is arranged directly below the flap which closes the passage opening in the instrument panel in a holding compartment which is molded integrally onto the reinforcing semi-shell.

BRIEF DESCRIPTION OF THE DRAWINGS

The invention is explained further by way of exemplary embodiments with reference to the figures.

DETAILED DESCRIPTION OF THE PREFERRED EMBODIMENTS

Figure 1:
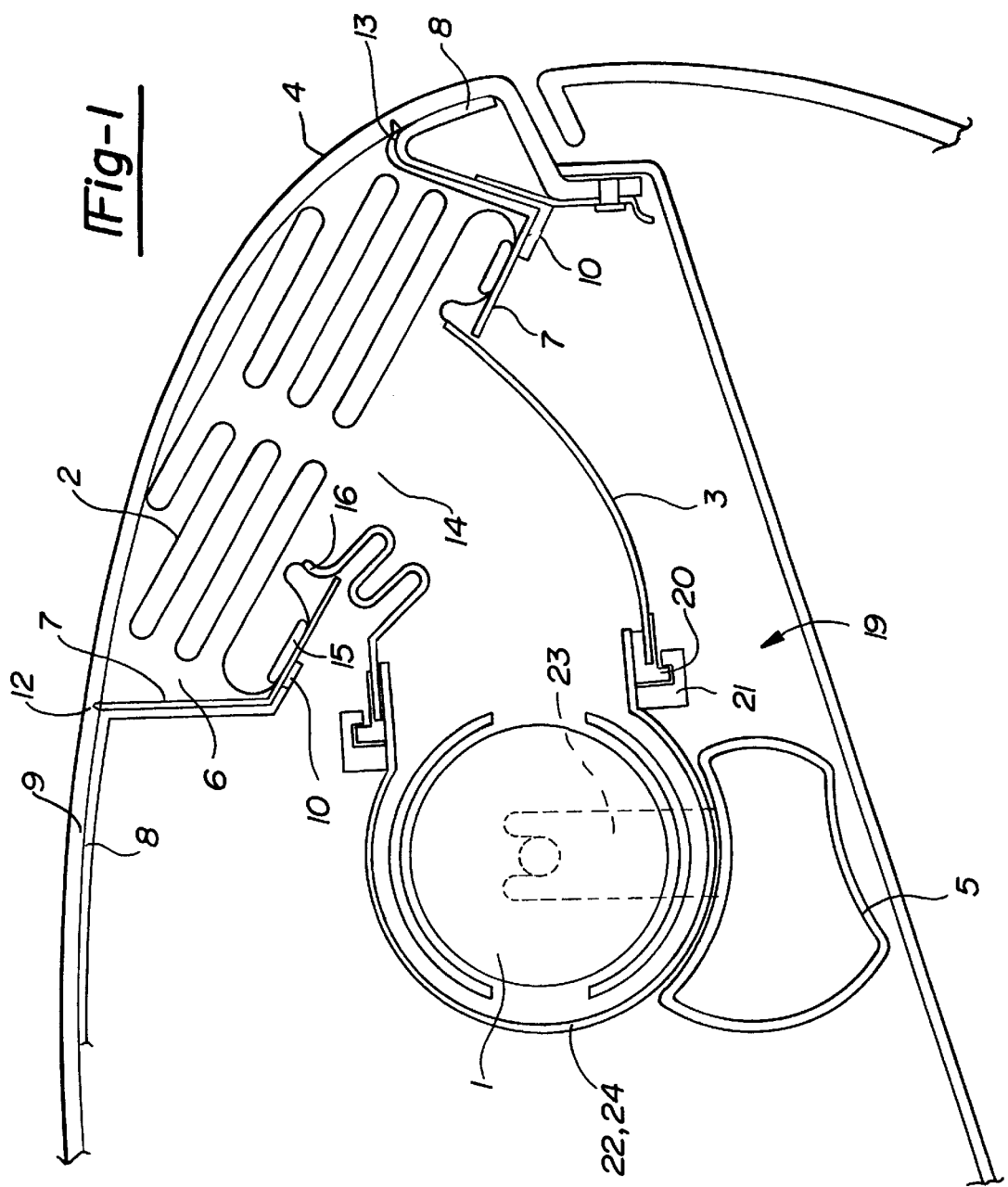
FIG. 1 shows a cross-sectional illustration of a first exemplary embodiment.

In the exemplary embodiments illustrated, a gas generator and a gas cushion are attached at separate places in the vehicle. The gas cushion 2 is arranged directly below a flap 4 in an instrument panel 9. The instrument panel 9 is designed in a known manner and may consist of a support, possibly laminated with a film. Formed in the support is an opening which, in the normal state as illustrated in the figures, is closed by the flap 4 with a hinge 12. In the case of a cover, the latter is connected to the instrument panel by means of a strap. As used herein, flap may also refer to cover, lid, closure or other means for covering the airbag gas cushion in its normal folded state. A reinforcing semi-shell 8 is located below the instrument panel 9. A holding compartment 6 for the gas cushion 2 is formed integrally with the said reinforcing semi-shell. The holding compartment 6 can also serve as a chute to guide the airbag which unfolds while it is being filled. The instrument panel and the reinforcing semi-shell may be connected to one another, for example by bonding, to form a unit (for example, as described in patent documents EP 06 88 700 and DE 44 21 820).

Located on the inner side of that part of the reinforcing semi-shell which is shaped to form the receiving compartment 6 for the folded gas cushion 2 is a flat reinforcement, preferably made of metal, which rests against the inner side with a positive-locking connection. The reinforcement is fitted, in the manner of a trough, with an opening at the trough bottom. The folded gas cushion 2 is accommodated by the said reinforcing trough 7. The reinforcing trough 7 can be designed in the manner as is illustrated in the examples of FIGS. 3 to 6, in which the side wall of the reinforcing trough 7 partially covers the inner side of the holding compartment 8 and partially surrounds the folded gas cushion 2. However, the reinforcing trough can preferably be designed as illustrated in the exemplary embodiments of FIGS. 1 and 2. In these exemplary embodiments, the reinforcing trough 7 extends over the entire inside wall of the holding compartment 6 molded integrally onto the reinforcing semi-shell 8. Furthermore, as illustrated in FIGS. 1 and 2, the reinforcing trough 7 may be positioned over a shoulder 13 formed on the top side of the holding compartment 6.

The holding compartment 6, which is open at the bottom, has a peripheral support 10 on which the reinforcing trough 7 rests and is supported by its bottom. The reinforcing trough 7 has an opening 14 in the bottom. Through the said opening 14, the gas is permitted to enter into the interior of the gas cushion 2 during the filling operation. The reinforcing trough 7 forms a reinforcement of the holding compartment 6 molded integrally onto the reinforcing semi-shell 8. While the gas cushion 2 is being filled, compressive forces occur, in particular in the initial phase of the filling operation. In the final phase of the filling operation and at the end of the filling operation, oppositely directed tensile forces act. On account of the large-area support of the reinforcing trough 7 on the inside of the possibly conically shaped holding compartment 6, the compressive forces are conducted into the vehicle body via the reinforcing semi-shell 8.

Furthermore, the gas cushion is connected in a pressure-tight manner to the bottom of the reinforcing trough 7 with the aid of a pressed-on attachment frame 15. The attachment frame 15 surrounds the opening 14 in the reinforcing trough 7. In the exemplary embodiments illustrated in FIGS. 1 and 2, the gas-tight connection to the gas conduit 3 is effected inside the attachment frame 15 which produces the gas-tight connection, surrounding the opening 14, between the reinforcing trough 7 and the gas cushion 2.

Figure 2:
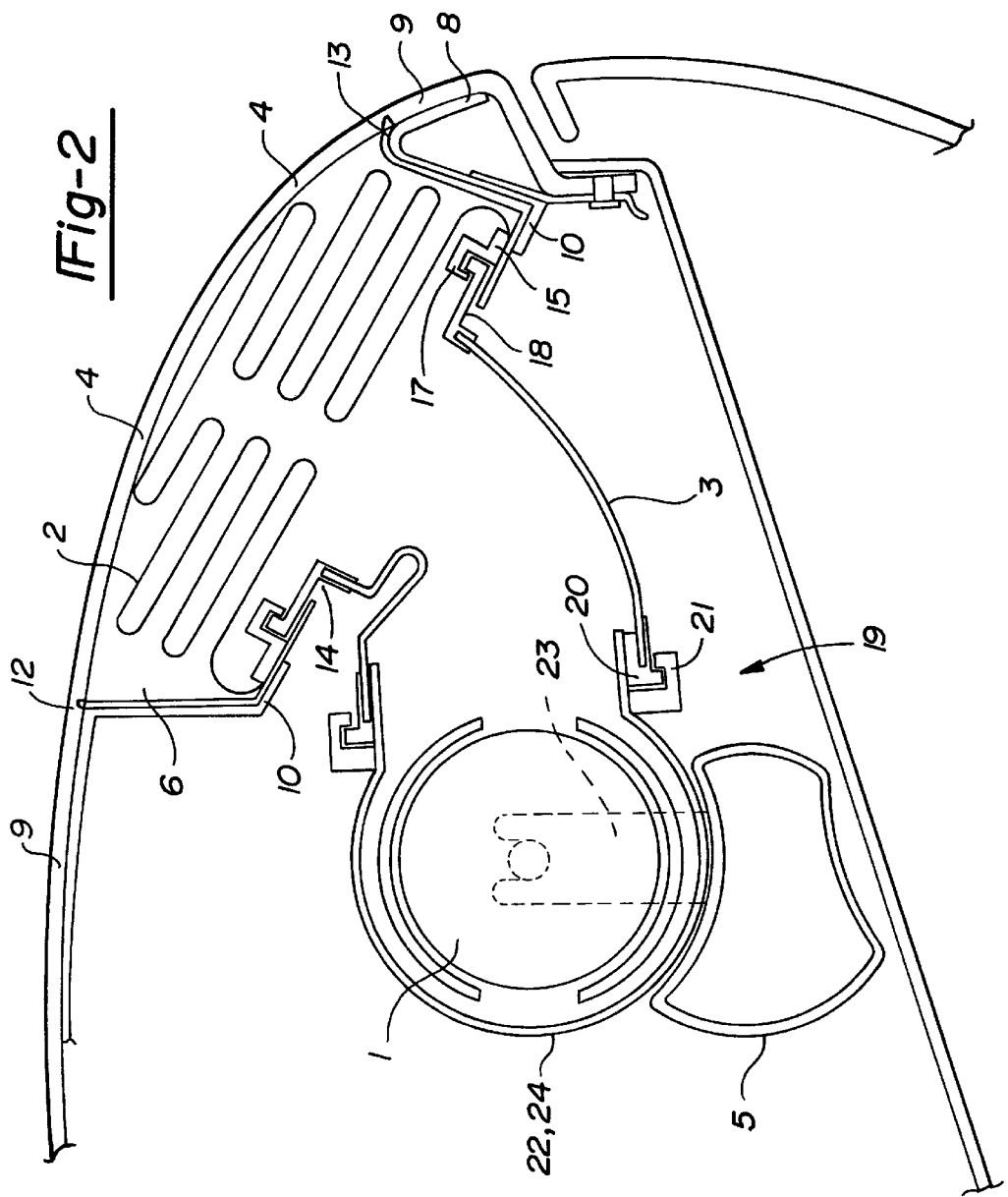
FIG. 2 shows a cross-sectional illustration of a second exemplary embodiment.

In the exemplary embodiments of FIGS. 1 and 2, the gas conduit 3, which produces the connection between the gas outlet side of the gas generator, which is formed by gas openings 11, and the inlet opening or the interior of the gas cushion 2, is formed by a flexible gas conduit 3. The flexible gas conduit 3 is designed in the form of a hose and is preferably formed from a textile fabric, provided with a gas-tight inner coating or a flexible metal tube. The textile fabric of the gas conduit 3 may be of the same type as the fabric of the gas cushion. A fabric in the shape of a hose, which is coated in a gas-tight manner is also suitable, such as is used in fire-fighting hoses or a flexible metal tube. The fabric of the gas conduit 3 is connected to the fabric of the gas cushion 2 in the region of one or more seams 16 (FIG. 1). The seam or the seams 16 lies or lie inside the gas-tight connection, brought about by the attachment frame 15, between the bottom of the reinforcing trough 7 and the gas cushion 2.

In the exemplary embodiment illustrated in FIG. 2, a counter-piece 17 for a bayonet closure 18, connected to the hose of the gas conduit 3, is molded onto the attachment frame 15.

In both embodiments of FIGS. 1 and 2, it is therefore possible to have an integral installation of the folded gas cushion 2 in the holding compartment 6 formed integrally on the reinforcing shell 8. The folded gas cushion 2 can thus be integrated or preassembled in the unit formed from the reinforcing semi-shell 8 and the instrument panel 9. In the exemplary embodiment illustrated in FIG. 1, the hose-like gas conduit 3 is sewn onto the gas cushion 2 which is preassembled and is integrated in the unit of the reinforcing semi-shell 8 and the instrument panel 9. In the exemplary embodiment illustrated in FIG. 2, the connection of the integrated gas cushion 2 may already have been effected by means of the bayonet closure 18 in the preassembled state or may be effected retrospectively. The connection of the integrated gas cushion 2 to the gas outlet side of the gas generator 1 by means of the gas conduit 3 is effected in both exemplary embodiments by means of a gas-tight closure which can be produced retrospectively and may preferably be designed as a bayonet closure 19. The bayonet closure 19 comprises a closure piece 20 which is connected to the hose end of the gas conduit 3 and is inserted in a gas-tight manner into a bayonet receiver 21. The bayonet receiver 21 is fixedly connected to an attachment clip 22. By means of the attachment clip 22, the gas generator 1 is fixedly connected to a cross-strut 5 (cross-strut AA) which extends between the two A-pillars of the vehicle. For this purpose, the clip 22, between which the gas generator 1 is held, can be fixedly connected to the cross-strut 5 by welding or by other means. For a positive-locking connection, the cross-strut 5 has a through-like recess into which the clip 22 is inserted with the gas generator 1. Furthermore, holders 23 which are fixedly connected to the vehicle body can be provided between the clip 22 and the outside of the gas generator. The gas generator may be connected, for example, by being screwed to the holders 23.

However, the gas generator may also be fixedly connected at a different place of the vehicle body, for example to the splash wall. The flexible connection which can be produced by the gas conduit 3 between the integrated gas cushion 2 and the gas generator 1 permits an optimum arrangement of the gas generator 1 at a suitable place providing sufficient space for the non-positive connection of the mechanical gas-generator holder (clip 22 and/or holders 23) to the vehicle body. In particular, the gas generator may be arranged in such a way that the space for a glove compartment 12 is not impaired.

On account of the flexible design of the gas conduit 3, in particular in the form of a hose, a tolerance compensation is furthermore achieved between the attachment places at which the gas cushion 2 and the gas generator 1 are arranged. The gas generator 1 is preferably designed as a hybrid gas generator, as can be seen, in particular, in the exemplary embodiments of FIGS. 3 to 6. The detachable connection, in particular in the form of a bayonet closure 19, between the gas outlet side of the gas generator 1 and the gas conduit 3 facilitates the servicing of the gas generator, in particular the exchange of the gas generator, within a prescribed cycle (about 10 to 12 years). For this purpose, only the bayonet closure 19 has to be released in order to obtain easy access to the gas generator 1. The fixed attachment of the gas conduit 3 to the reinforcing trough 7 and the cross-strut 5 or a different component on the vehicle body reliably ensures that excessive tensile forces occurring when the airbag is being filled are absorbed by the vehicle body.

Figure 3:
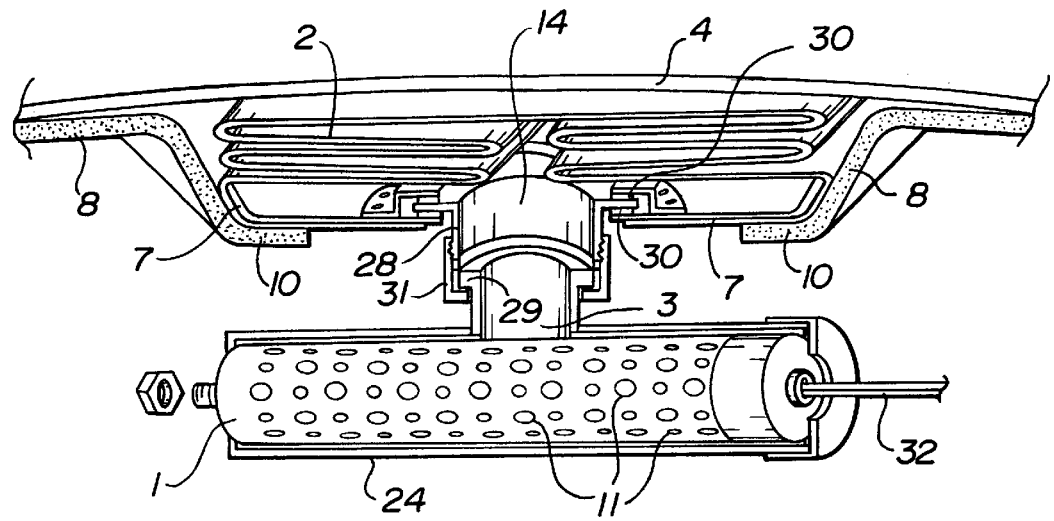
FIG. 3 shows a cut-away perspective view of a third exemplary embodiment.
Figure 4:
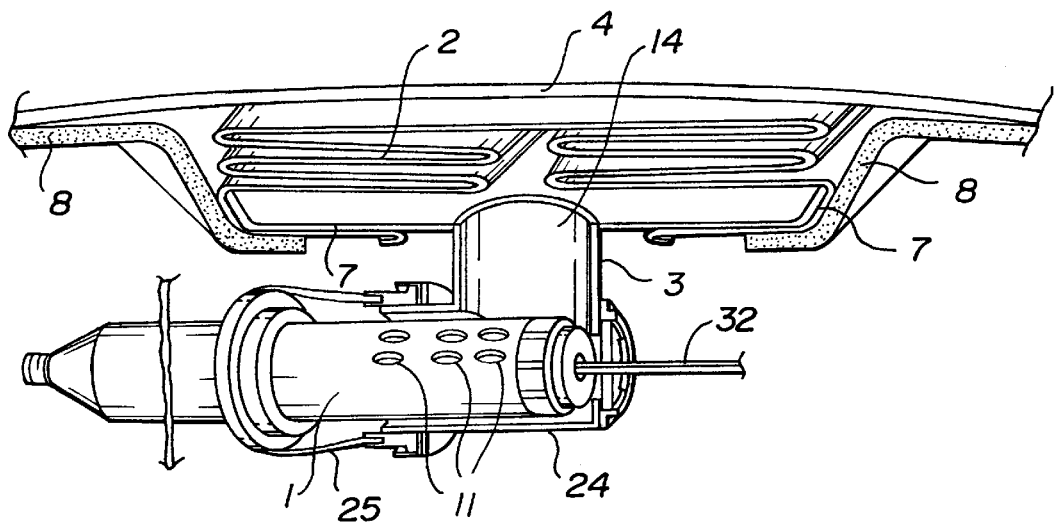
FIG. 4 shows a cut-away perspective view of a fourth exemplary embodiment.
Figure 5:
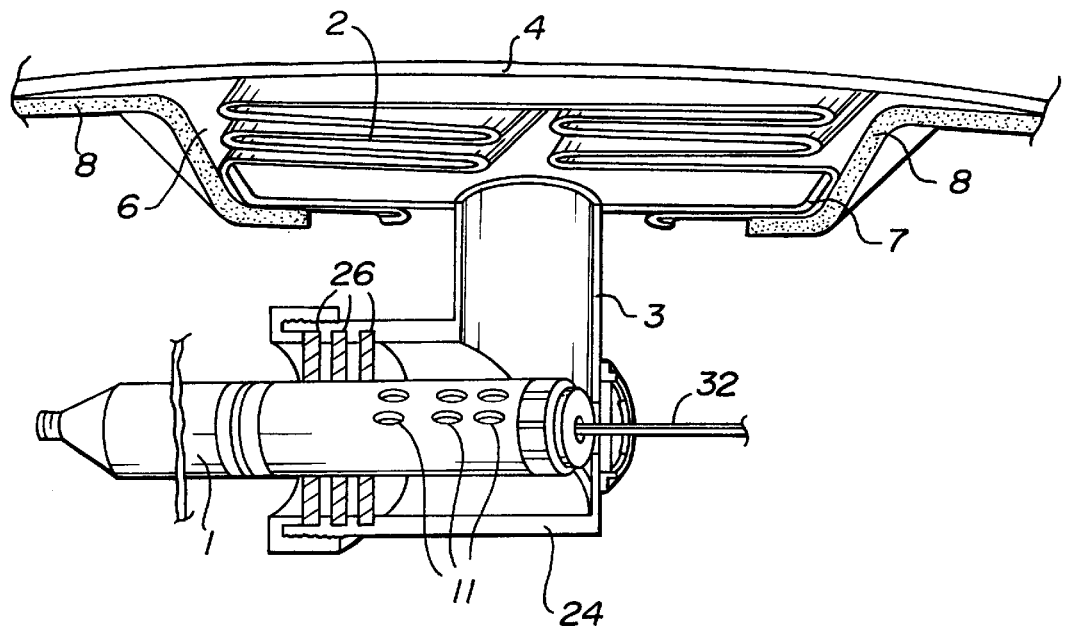
FIG. 5 shows a cut-away perspective view of a fifth exemplary embodiment.
Figure 6:
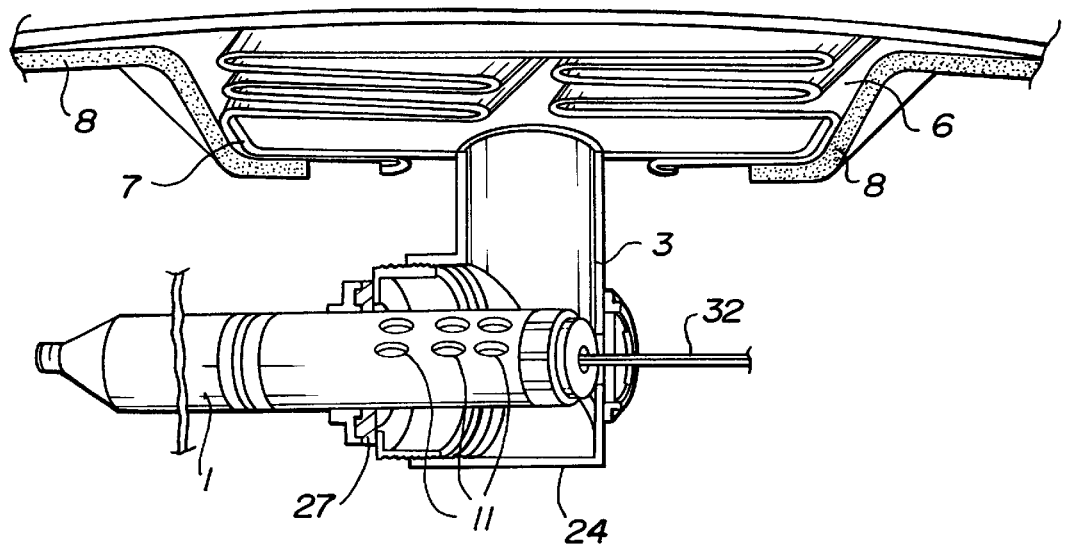
FIG. 6 shows a cut-away perspective view of a sixth exemplary embodiment.

Further exemplary embodiments of the invention are illustrated in FIGS. 3 to 6. In these exemplary embodiments, the gas conduit 3 between the gas generator 1 and the gas cushion 2 to be filled, which is integrated in the unit comprising the reinforcing shell 8 and the instrument panel 9, consists partially or completely of a firm material, means which compensate tolerances being provided at suitable connection points. The gas generator 1 may be attached in a stationary manner with the aid of a screw connection to a suitable part of the vehicle body, e.g. the cross-strut AA or splash wall and the like. The gas generators used can be designed in such a way that gas outlet openings 11 are provided, which are distributed around their circumference and form the gas outlet side of the gas generator 1. A gas conduction cylinder 24 surrounds the gas outlet openings 11 and is connected to the gas conduit 3. In the embodiments of FIGS. 4, 5 and 6, the upper end of the gas conduit 3 is fixedly connected, for example by welding, to the reinforcing trough 7. The clip 22, shown in FIGS. 1 and 2, may also be designed as a gas conduction cylinder. In the exemplary embodiment illustrated in FIG. 4, the attachment of the gas generator 1, so as to compensate tolerances, to the gas conduction cylinder 24, connected to the gas conduit 3, is effected by means of a flexible hose 25 which, like the flexible hose in exemplary embodiments 1 and 2, may likewise consist of a textile fabric which is provided in the inner side with a gas-tight coating.

In the exemplary embodiment of FIG. 5, the gas-tight means which compensate tolerances may consist of flexible rubber diaphragms or diaphragms made of ethylene/propylene elastomers, in particular EP DM (ethylene/propylene/diene terpolymer) diaphragm materials which ensure the axial attachment of the gas generator provided at the stationary attachment point on the vehicle body. In the exemplary embodiment, a plurality of rubber diaphragms 26 are provided, which are disposed one behind the other and ensure the positive-locking and gas-tight detachment of the gas conduit (gas conduction cylinder 24) to the gas generator 1 attached in a stationary manner to the vehicle body.

In the exemplary embodiment illustrated in FIG. 6, the gas-tight axial attachment, which compensates tolerances, of the gas conduit (gas conduction cylinder 24) to the gas generator 1 attached in a stationary manner to the vehicle body is effected by means of a cutting-ring seal 27 which may consist of a thermoplastic material. When the filling gas flows out of the gas outlet openings, the cutting-ring seal 27 is pressed in the direction of pressurization.

Whereas, in the exemplary embodiments of FIGS. 4, 5 and 6, an axial attachment of the gas conduit and the gas generator 1 is produced, in the exemplary embodiment of FIG. 3 a radial attachment of the gas conduit is effected with the aid of threaded bushes 28 and 29. The lower threaded bush 29 may be fixedly connected, for example by welding, to the gas conduction cylinder 24. The upper threaded bush 28 is connected to the bottom of the reinforcing trough 7 by means of sealing rings 30 which, in the exemplary embodiment, are designed as radial shaft seals. The sealing rings 30 form the connection, which compensates tolerances, of the gas generator 1, which is mounted fixedly on the housing body, to the reinforcing trough 7. The two threaded bushes 28 and 29 are connected to one another by means of a union knot 31. In this embodiment, additional tolerance compensation is ensured by means of the rotatable arrangement of the gas generator 1 and the displacement capacity of the gas conduit 3 which is formed by the threaded bushes 28 and 29 and the union knot 31.

The gas generators 1 used in different exemplary embodiments may be designed as hybrid gas generators. In FIGS. 3 to 6, electrical ignition cables 32 are provided for igniting the gas generators.

Of course, it should be understood that changes and modifications can be made to the preferred embodiments described above. It is therefore intended that the foregoing detailed description be regarded as illustrative rather than limiting, and that it be understood that it is following claims, including all equivalents, which are intended to define the scope of this invention.

What is claimed is:

1. An airbag device installed in an instrument panel below a flap on the passenger side of a motor vehicle having a vehicle frame, the airbag device having a gas generator for a filling gas, a gas conduit, and a gas cushion arranged in a holding compartment which, when filled with the filling gas, the gas cushion unfolds into the vehicle interior on the passenger side through an opening in the instrument panel which, in the state of rest, is covered by the flap, the holding compartment being fitted on its inside with a trough-shaped reinforcing surface which is connected to the gas cushion in a gas-tight manner wherein at least one of a compressive and a tensile force acting during the unfolding process can be absorbed by the reinforcing trough and can be transmitted by way of at least one of a reinforcing semi-shell and the gas conduit to the vehicle body, the gas cushion being attached to the instrument panel, the gas generator being attached to the vehicle frame, and both the gas cushion and the gas generator being in communication with one another by means of the gas conduit, the gas conduit being flexibly attached to the gas generator permitting movement of the conduit while the gas generator remains stationary, and the gas conduit being attached to the gas cushion such that the gas conduit is free to move while the instrument panel remains stationary.

2. An airbag device according to claim 1, wherein in the folded state, the gas cushion is integrated in a unit comprising the instrument panel and a reinforcing semi-shell, the gas generator is supported on a component which is fixedly connected to the vehicle body, and the gas conduit is designed to compensate tolerances.

3. An airbag device according to claim 1 wherein the gas conduit is connected to the gas outlet side of the gas generator and to the gas inlet opening of the gas cushion in a substantially gas-tight manner.

4. An airbag device according to claim 1 wherein the gas generator is attached to a cross-strut which extends between two A-pillars of the vehicle frame.

5. An airbag device according to claim 4, wherein the gas generator is arranged on the top side of the cross-strut.

6. An airbag device according to claim 4 wherein the gas generator is attached to the cross-strut with a positive-locking connection.

7. An airbag device according to claim 1 wherein the gas conduit is detachably connected to the gas outlet side of the gas generator.

8. An airbag device according to claim 1, wherein the holding compartment is formed by a one-piece molding onto the reinforcing semi-shell which forms a unit with the instrument panel.

9. An airbag device according to claim 1 wherein the holding compartment is designed as a chute to guide the gas cushion when it unfolds.

10. An airbag device according to claim 1, wherein an annular gas-tight connection between the reinforcing trough and the gas cushion surrounds the gas inlet opening of the gas cushion which is connected to the gas conduit.

11. An airbag device according to claim 1 wherein the holding compartment has a support for a reinforcing trough in the region of the bottom of the reinforcing trough.

12. An airbag device according to claim 1 wherein the gas conduit is connected to the reinforcing trough in a gas-tight manner.

13. An airbag device according to claim 1 wherein the gas conduit surrounds the gas outlet side of the gas generator in a gas-tight manner.

14. An airbag device according to claim 1 further comprising tolerance-compensating means provided between the reinforcing trough and the gas generator.

15. An airbag device according to claim 1 wherein the gas conduit is designed to be flexible for tolerance compensation.

16. An airbag device according to claim 1 wherein the gas conduit is designed as a hose.

17. An airbag device according to claim 16, wherein the hose of the gas conduit is made from a textile fabric and has a gas-tight coating on its inside wall.

18. An airbag device according to claim 16 wherein the hose of the gas conduit is sewn to the gas cushion.

19. An airbag device according to claim 16 wherein the hose of the gas conduit is a flexible metal tube is connected to the gas cushion.

20. An airbag device installed in an instrument panel below a flap on the passenger side of a motor vehicle having a vehicle frame, the airbag device having a gas generator for a filling gas, a gas conduit, and a gas cushion arranged in a holding compartment, the holding compartment being fitted on its inside with a trough-shaped reinforcing surface which is attached on one end to the instrument panel by at least one reinforcing semi-shell, said reinforcing surface being connected on an opposite end to the gas cushion in a gas-tight manner wherein at least one of a compressive and a tensile force acting during the unfolding process can be absorbed by the reinforcing trough and can be transmitted through the at least one reinforcing semi-shell to the instrument panel, the gas cushion also being attached to the gas conduit such that the gas conduit is free to move with respect to the instrument panel, the gas conduit also being flexibly connected to the gas generator allowing movement of the gas conduit while the gas generator remains stationary the gas generator being fixed to the vehicle frame.

21. An airbag device according to claim 20 wherein the holding compartment has a support for the reinforcing trough in the region of the bottom of the reinforcing trough.

22. An airbag device according to claim 20 wherein the gas cushion, when filled with the filling gas, unfolds into the vehicle interior on the passenger side through an opening in the instrument panel which, in the state of rest, is covered by the flap.

23. An airbag device according to claim 22 wherein the holding compartment is designed as a chute to guide the gas cushion when it unfolds.

24. An airbag device according to claim 20 further comprising tolerance-compensating connecting means provided between an end of the gas conduit and the reinforcing trough and an opposite end of the gas conduit and the gas generator.

* * * * *